United States Patent Office 3,553,116
Patented Jan. 5, 1971

3,553,116
MECHANICALLY AND FREEZE-THAW STABLE AQUEOUS EMULSIONS OF IMINATED CARBOXYLIC VINYL ACETATE/ETHYLENE COPOLYMERS AND PROCESS FOR PREPARING SAME
Charles A. Kaplan, Longview, Tex., and Robert A. Ripley, Ottawa, Ontario, Canada, assignors to E. I. du Pont de Nemours and Company, Wilmington, Del., a corporation of Delaware
No Drawing. Continuation-in-part of application Ser. No. 664,284, Aug. 30, 1967. This application Mar. 14, 1969, Ser. No. 807,410
Int. Cl. C08f 3/62, 27/08, 29/10
U.S. Cl. 260—17                    23 Claims

ABSTRACT OF THE DISCLOSURE

Mechanically and freeze-thaw stable aqueous emulsions of iminated carboxylic vinyl acetate/ethylene copolymers containing, as protective colloids, water-soluble polyvinyl alcohols or cellulose derivatives are provided. The dispersions are prepared by copolymerizing the monomers in the presence of the protective colloid and, thereafter, imitating the copolymer.

CROSS-REFERENCE TO RELATED APPLICATIONS

This application is a continuation-in-part of application Ser. No. 664,284, filed Aug. 30, 1967, now abandoned.

BACKGROUND OF THE INVENTION

Field of the invention

This invention relates to mechanically and freeze-thaw stabilized aqueous emulsions of particular carboxylic polymers which have been iminated by reacting the pendant carboxylic acid groups, or salts thereof, with an aziridine compound. Stability of the emulsions is obtained by using a particular type protective colloid during polymerization of the monomers and, subsequently, iminating the copolymer.

Description of the prior art

French Pats. 1,441,939 and 1,441,940 and German Pat. 1,127,085 illustrate the use of water-soluble cellulose derivatives and polyvinyl alcohols as protective colloids in the preparation of vinyl acetate/ethylene copolymer emulsions. While such emulsions are of limited use in a variety of applications, such as the polymeric constituents of aqueous based paints, their utility is generally restricted by the fact that they do not possess good mechanical and freeze-thaw stability. As is well known, mechanical stability, which is an indication of an emulsion's resistance to coagulation upon agitation, and freeze-thaw stability, which is an indication of an emulsion's resistance to coagulation upon repeated cycles of freezing and thawing, are important when an emulsion is going to be mechanically mixed with other ingredients or subjected to varying temperature cycles before its actual end use application. Accordingly, mechanical and freeze-thaw stable vinyl acetate/ethylene copolymer emulsions would be very desirable.

SUMMARY OF THE INVENTION

According to the present invention there are provided mechanically and freeze-thaw stable emulsions comprising an aqueous phase having dispersed therein an iminated carboxylic vinyl ester/ethylene copolymer and also containing at least 0.2 weight percent, based on the weight of the copolymer, of a protective colloid selected from water-soluble cellulose derivatives and water-soluble polyvinyl alcohols; the copolymer having been prepared in the presence of the protective colloid and containing 1–18 weight percent copolymerized ethylene, 80–95 weight percent copolymerized vinyl ester, and, prior to imination, 0.01–1.0 milliequivalent of acid per gram of polymer. The present emulsions have an extraordinarily high degree of mechanical and freeze-thaw stability and, additionally, paints formulated with the emulsions exhibit increased wet adhesion properties in comparison with paints formulated using ordinary vinyl acetate/ethylene copolymer emulsions.

DESCRIPTION OF THE INVENTION

The carboxylic vinyl ester/ethylene copolymers useful in the present invention are substantially water-insoluble copolymers containing, prior to imination, pendant carboxyl groups (—COOH) or their salts (e.g., —COOK). These copolymers are copolymerized products of a lower vinyl ester, ethylene and at least one monomer containing both polymerizable olefinic unsaturation and carboxylic acid groups (or an equivalent source of carboxyl groups).

Useful carboxylic copolymers contain about 80–95 weight percent copolymerized vinyl ester, about 1–18 weight percent copolymerized ethylene, and have 0.01–1.0 milliequivalent of acid per gram of polymer. Preferably, such carboxylic polymers contain 83–92 weight percent copolymerized vinyl ester, 7–16 weight percent copolymerized ethylene, and 0.05–0.5 milliequivalent of acid per gram of polymer. Since, as hereinafter set forth, a variety of compounds having different molecular weights can be used to provide the carboxylic moiety in the present copolymers, weight percent copolymerized acid cannot be precisely correlated with the above recited acid milliequivalent range. However, for lower carboxylic acids such as acrylic and methacrylic acids, copolymerized weight percentages of about 0.5–10 and, preferably 0.7–4 weight percent, are useful.

While vinyl acetate is the preferred vinyl ester monomer, other vinyl esters of lower carboxylic acids, such as vinyl formate, vinyl propionate and vinyl butyrate, can also be used. Also, the carboxylic acid monomer can be selected from a wide variety of olefinically unsaturated carboxylic acids. Particularly preferred, however, are the monocarboxylic acrylic and methacrylic acids since the carboxylic acid copolymers prepared are especially compositionally homogeneous. However, many other unsaturated carboxylic acids are operable as well. Illustrative of some of these are other monocarboxylic acids, such as crotonic acid, and dicarboxylic acids, such as itaconic acid, maleic acid, and fumaric acid. Mixtures of the above acids, as well as the half esters, of dicarboxylic acids, such as methylhydrogen maleate can likewise be used. Also, other copolymerized monomers, such as ethyl acrylate, 2-ethylhexyl acrylate, and vinyl versatate can replace a small portion of the copolymerized ethylene content present in the copolymers.

Useful techniques of preparing carboxylic vinyl ester/ethylene copolymers are well known as illustrated by the aforementioned patents. More particularly, the polymerization is usually carried out in an emulsion in a closed vessel under an ethylene pressure sufficient to introduce the desired amount of ethylene into the polymer. In general, pressures on the order of about 150 p.s.i. to about 1,000 p.s.i. are employed; the higher pressures being used when larger amounts of ethylene are to be introduced into the polymer. Both continuous and batch polymerization techniques are known to be useful in preparing carboxylic polymers. In continuous polymerization techniques, polymerization temperatures generally range from about 80° C. up to as high as about 115° C. On the other hand, for batch polymerizations, the temperatures generally range from about 20° C. to about 100° C. and, preferably, between about 60° C. and 90° C.

The carboxylic polymer is produced in any molecular weight that is desired. Usually the molecular weight is above 100,000 for polymers used as binders in paint formulations, but even molecular weights of about a million and above are frequently used. Similarly, emulsions can be prepared with solids levels of 10 to upwards of 60 percent.

While known polymerization techniques can be used, the polymerization must be accomplished in the presence of a water-soluble protective colloid in order to insure subsequent mechanical and freeze-thaw stability. Depending on the manner of polymerization, i.e., whether batch or continuous, the colloid can be added continuously or all at once to the polymerization reaction mixture. While the precise reasons why the use of the colloid in combination with the subsequent imination yields freeze-thaw stable emulsions is not understood, it is felt that there is a degree of free radical chain transfer between the colloid and free radicals in the system.

Protective colloids useful in the present invention are water-soluble, non-ionic cellulose derivatives and water-soluble polyvinyl alcohols. As used in the present invention, the term "water-soluble" means that the particular protective colloid is soluble in water at the temperature at which the polymerization reaction is to be accomplished. In particular, methyl cellulose and especially hydroxyethylcellulose have been discovered to be useful as protective colloids in the present invention. These colloids are useful over all of the ordinarily employed polymerization temperature ranges. On the other hand, cellulose derivatives, such as hydroxypropyl cellulose, which is soluble only at lower temperatures, is only useful when the polymerization temperature is of lower magnitude. With cellulose derivative colloids, it is well known that the degree of substitution on the basic cellulose ring influences the water solubility. Accordingly, the degree of substitution for cellulosic colloids useful in the present invention must be such as to render the colloid soluble. For hydroxyethylcellulose, a degree of substitution of about 2.5-3 is preferred. Also, while the viscosity of the cellulose derivative is not especially limited in the present invention, it is desirable to use those having a 2 percent water solution Brookfield viscosity (#2 spindle at 60 r.p.m.) no higher than about 500 centipoises at 25° C.

In addition to cellulose derivatives, water-soluble polyvinyl alcohols are also useful as protective colloids in the present invention. Such polyvinyl alcohols preferably contain enough acetate groups to provide solubility in cold water, although completely hydrolyzed grades may also be used. In general, useful polyvinyl alcohols have a degree of hydrolysis of about 85–100 percent; the balance being vinyl acetate. As with the cellulose derivatives, the viscosity of the polyvinyl alcohol colloid is not especially limited in the present invention though it is preferred to use a polyvinyl alcohol which has a 4 percent water solution Hoeppler falling ball viscosity of no higher than about 45 centipoises at 20° C.

The amount of protective colloid employed in the polymerization reaction is usually from about 0.2–3 weight percent, based on the total monomer weight. While higher concentrations of colloid can be used, the polymer emulsion tends to become excessively viscous and, thus, amounts in excess of about 3 percent are not ordinarily employed. A preferred range which provides good freeze-thaw stability and avoids excessively high emulsion viscosities is about 0.3–1 percent.

With the exception of the inclusion of a protective colloid in the polymerization reaction, the other conditions and ingredients of the polymerization reaction are those customarily employed in known methods. In general, the polymerization reaction medium includes at least about 0.5 weight percent, based on the monomer weight, of an anionic surfactant. Preferably, the amount of this surfactant is 1–2 weight percent. The anionic surfactant can be any one or a combination of the type commonly used in emulsion polymerization, such as organic phosphates, sulfosuccinates, alcohol sulfates, aryl and alkylaryl sulfonates, and sulfated ethoxylated alkyl phenols, among others.

Correspondingly, about 0.5–3 weight percent of a non-ionic surfactant can also be used in addition to the anionic surfactant. Suitable non-ionic surfactants include the reaction products of ethylene oxide with long chain fatty alcohols, ethoxylated alkylphenols, alkanol amides, sorbitan derivatives, etc. The non-ionic surfactant, in addition to being present during the emulsion polymerization, can also be added to the emulsion after polymerization as a stabilizer.

In addition to surfactants, it is also frequently desirable to carry out the polymerization in the presence of a basic compound which acts as a buffer. As illustrated in U.S. Pat. 3,271,373, coagulum formation during polymerization can frequently be reduced by neutralizing about 5–70 percent of the acid groups present in the polymer with a suitable base. Regarding the polymerization initiators, any of the free radical type initiators commonly used in emulsion polymerization can be employed. Among others, these include persulfates, perborates, peroxides, and azonitriles. The oxidizing initiators can be used in conjunction with reducing agents, such as sodium metabisulfite, sodium formaldehyde sulfoxylate, etc.

After polymerization in the presence of the protective colloid, the carboxylic polymer is iminated by being reacted with an aziridine compound. The aziridine compound is commonly referred to as an alkylene imine and has the formula:

Formula A

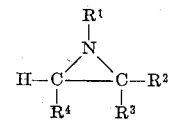

wherein:

$R^1$ is hydrogen, benzyl or a $C_1$ to $C_5$ alkyl radical, and is preferably hydrogen or a $C_1$ to $C_4$ alkyl radical;

$R^2$ and $R^3$ are selected individually from the group consisting of hydrogens, benzyl, aryl and $C_1$ to $C_5$ alkyl radicals; and $R^4$ is hydrogen or a $C_1$ to $C_5$ alkyl radical.

Ethylenimine (Formula B) and propylenimine (Formula C) are particularly preferred aziridines, because of their relatively low cost and plentiful supply.

Formula B   Formula C

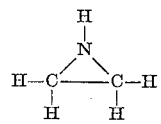  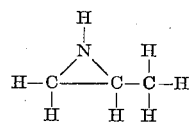

The aziridine compound is added to the carboxylic copolymer emulsion in an amount sufficient to iminate about 5–55 percent, and preferably 20–40 percent, of the acid groups. The degree of imination is established by measuring the disappearance of the acid functionality by titration before and after imination. Titration is carried out in a pyridine solution using a methanol solution of tetrabutylammonium hydroxide with thymol blue as an indicator. Imination is accomplished by adding the aziridine compound to the emulsion in an amount equal to about 10–200 percent, preferably 60–150 percent, of the theoretical stoichiometric amount required to react with all of the pendant carboxyl groups (assuming one aziridine molecule reacts with one carboxyl group). Generally, about 30 percent imination is obtained by the addition of the aziridine compound in about the theoretical stoichiometric amount required for complete imination. What exactly occurs when the aziridine compound is added to the emulsion is not completely understood; however, among others, at least some of the following reactions are thought to take place: reaction of the aziridine compound with a carboxyl group to yield amino esters; rearrangement of amino esters to hydroxyamides; multiple addition of the aziridine compound to the amino ester to form polyamine side chains; hydrolysis of the aziridine compound; aziridine homopolymerization; and reactions between amine groups and acetate groups.

As illustrated in U.S. Pats. 3,261,796; 3,261,797; 3,261-799; and 3,282,879, typical procedures for carrying out the imination reaction simply comprise mixing the aziridine compound with the carboxylic copolymer emulsions. Preferably, the mixture is reacted at about 40–75° C. until the added aziridine is essentially consumed (e.g. about ½ hour at the higher temperature to about 12 hours at the lower temperature), and finally the reaction product is cooled to room temperature. The entire reaction can be carried out at room temperature, but heating is generally preferred because of the shorter reaction time.

When the polymerization and imination is accomplished as described herein, i.e., polymerization, preferably using a buffer, in the presence of a protective colloid and imination with 10–200 percent of the theoretically necessary amount of aziridine compound to react with all of the acid, the resulting emulsions are freeze-thaw and mechanically stable. The pH of such emulsions are usually about 7–8, particularly for those emulsions prepared according to the preferred aspects of the present invention. When, after preparation, it is desired to adjust the pH of the emulsion to a different value, the properties of the emulsion may be altered. For example, if a pH of less than about 7, and particularly less than 6.5, is desired, freeze-thaw and mechanical stability of the emulsion may be sacrificed. On the other hand, emulsion viscosity tends to markedly increase at a pH in excess of about 8. A pH above about 8.5 is hard to maintain due to the formation of acetic acid through the hydrolysis of acetate groups. Since the necessity, if any, for altering pH usually occurs immediately prior to the end use application of the emulsion, when freeze-thaw and mechanical stability have diminished significance, the effect of adjusting pH on emulsion properties is of limited importance.

To prepare a paint formulation, any of the ordinary water-insoluble inorganic and organic paint pigments well known in the art can be mixed with the present iminated emulsions. However, the relative amount and type of pigment in the formulation has significant effect on the properties of the paint. A pigment volume concentration of about 10% is about the minimum proportion of pigment which will provide a paint which has a practical hiding power. The maximum pigment volume concentration is about 70%. Preferably, however, a pigment volume concentration in the range of 25–65% is desirable. Pigment volume concentration is the ratio expressed on a percent basis of the volume of pigment to the total volume of pigment plus film-forming materials of the compositions; the volume of pigment is the volume of vehicle displaced by the pigment wet with vehicle.

The following examples illustrate the invention. All parts and percentages are by weight, unless otherwise indicated.

EXAMPLE I

A stainless steel autoclave equipped with agitator, two liquid and one gas feed lines, temperature and pressure sensing and recording devices and a water-filled jacket for cooling and heating was purged with nitrogen and then with ethylene. An initial charge, the composition of which is indicated in Table 1, was added in two streams, one consisting of vinyl acetate and the other of the remaining ingredients as an aqueous solution. The agitator was started and the reactor pressured with ethylene to 190 p.s.i.g. The temperature was then raised to 86° C. over a 45-minute period. Subsequently, the ethylene pressure was raised to 315 p.s.i.g. and the continuous feeds, the compositions of which are indicated in Table 1, were started. During the continuous feed period of two hours the temperature was held at 87±2° C. and the pressure at 315 p.s.i.g. The temperature was then raised to 92° C. over a 30-minute period with the pressure at 350 p.s.i.g. The reaction mixture was then cooled.

TABLE I

| | Initial charge, parts | Continuous feeds, parts | |
|---|---|---|---|
| | | Aqueous a | Organic b |
| Anionic surfactant c | 0.30 | 1.21 | |
| Anionic surfactant d | .13 | .52 | |
| Potassium hydroxide | .080 | .326 | |
| Hydroxyethylcellulose e | .072 | .286 | |
| Ammonium persulfate | .27 | .09 | |
| Water | 33.58 | 27.48 | |
| Vinyl acetate | 3.0 | | f 58.0 |
| Methacrylic acid | | | 1.44 | a At a constant rate of 0.33 part/min.
b At a constant rate of 0.50 part/min.
c "Gafac" RE-960-alkyl phenoxypolyethoxy ethyl phosphate, mol. wt. 16,000.
d "Gafac" RE-610-alkyl phenoxypolyethoxy ethyl phosphate, mol. wt. 5,000.
e "Natrosol" 250G-deg. of substitution=2.5, Brookfield viscosity of 2% aqueous solution at 25°C.=150–400 cp.
f Only vinyl acetate added for the first 6 minutes.

The emulsion had a solids content of 53.2% and a residual vinyl acetate monomer content of 0.58%. The composition of the polymer, by weight, was 87.4% vinyl acetate, 10.6% ethylene and 2% methacrylic acid. The hydroxyethylcellulose content was about 0.5%, based on total solids.

Seventy five parts of the emulsion was placed in a vessel equipped with the agitator, dip tube, condenser set for distillation, and jacket for heating and cooling. 0.075 parts of Colloid 581B antifoam agent was added to this emulsion. While nitrogen was introduced through the dip tube, the agitated emulsion was heated to 70° C. over a period of 120 minutes and held at 70–73° C. for 135 minutes. This treatment resulted in a decrease in vinyl acetate monomer content to 0.14%.

The emulsion was then cooled to 55° C. and a solution of 0.4 part of ethylenimine in 3.1 parts of water (about 100 percent of theoretical stoichiometric amount) added with agitation. After 30 minutes at 55–57° C. the emulsion was cooled to room temperature and 12 parts of water added. The product had a solids content of 45.6%, a pH of about 7.6, and a Brookfield viscosity of 870 cp. at 25° C. (#4 spindle at 60 r.p.m.).

The emulsion of Example I remained fluid after 60 hours at 70° C. while an emulsion made in a similar manner without the hydroxyethylcellulose gelled in 5 hours at 70° C.

The product also showed good mechanical stability by remaining fluid after agitation for 15 minutes in a Waring Blendor. An emulsion made in a similar manner without hydroxyethylcellulose coagulated.

EXAMPLE II

An emulsion of a vinyl acetate/ethylene/methacrylic acid copolymer containing 2% of methacrylic acid and 9.4% of ethylene was prepared by a process similar to that of Example I. The hydroxyethylcellulose content was about 0.5% based on total solids. Total solids content was 50.0% after stripping with nitrogen to a vinyl acetate monomer content of 0.17%.

To 900 parts of the emulsion heated to 55° C. was added dropwise with agitation a solution of 4.36 parts of ethylenimine in 15 parts of water. The emulsion was kept at 55° C. for 30 minutes and then cooled to room temperature. Its pH was 7.2 and its viscosity was 280 cp. at 25° C. as determined with a Brookfield viscosimeter using a No. 4 spindle at 60 r.p.m.

A sample of the emulsion was tested for freeze-thaw stability by alternately freezing at −18° C. for 16 hours and thawing at room temperature for 8 hours. After five such cycles of freezing and thawing the viscosity of the emulsion was only 710 cp. An iminated emulsion prepared in a similar manner but without the hydroxyethylcellulose coagulated in one freeze-thaw cycle. An additional sample of the Example II emulsion was tested for freeze-thaw stability, prior to the imination step. This sample coagulated after only one cycle.

The iminated Example II emulsion also showed good mechanical stability in that it remained fluid after agitation for 15 minutes in a Waring Blendor. An emulsion made in a similar manner without hydroxyethylcellulose coagulated.

Additionally, a coating of the Example II emulsion was applied to a panel of southern yellow pine by brushing the product onto the wood with a paint brush and allowing it to dry for one week. The resulting coating showed excellent wet adhesion to the wood after immersion in water for 24 hours. A similar coating from the uniminated emulsion showed poor wet adhesion.

EXAMPLE III

The equipment and general procedure of Example I were used to prepare an emulsion of a vinyl acetate/ethylene/acrylic acid copolymer containing 1.7% of acrylic acid and 13.0% of ethylene. Polyvinyl alcohol at a concentration of about 1% based on total solids was used as a protective colloid. The feed compositions used to prepare this emulsion were as follows:

| | Initial charge, parts | Continuous feeds, parts | |
|---|---|---|---|
| | | Aqueous | Organic |
| Anionic surfactant [1] | 0.62 | 2.46 | |
| Nonionic surfactant [2] | .22 | .86 | |
| Polyvinyl alcohol [3] | .11 | .43 | |
| Sodium bicarbonate | .05 | .22 | |
| Ammonium persulfate | .20 | .07 | |
| Water | 25.43 | 15.57 | |
| Vinyl acetate | 1.2 | | 45.34 |
| Acrylic acid | | | .92 |

[1] "Aerosol" A-102-disodium salt of half ester of sulfosuccinic acid derived from straight chain ethoxylated alcohol mixture.
[2] "Triton" X-102-octylphenylpolyether alcohol,12-13 ethylene oxide groups per molecule.
[3] "Elvanol" 52-22 E. I. du Pont de Nemours & Co.'s registered trademark for a water-soluble polyvinyl alcohol which is 87.2-89.2 mole percent hydrolyzed and has a viscosity of 21-25 cp. (Hoeppler falling ball of 4% aqueous solution at 20° C.)

The polymerization was carried out at 77±2° C. under 400 p.s.i.g. ethylene pressure. The aqueous and organic continuous feeds were added at rates of 0.15 and 0.36 parts/min., respectively, over a period of 130 minutes. The temperature was then raised ato 83° C. over a period of 50 minutes. The reaction mixture was then cooled. The solids content of the product was 56.4%.

To 35 parts of the Example III emulsion was added 0.2 part of ethylenimine in 1 part of water over a 10-minute period with stirring. Stirring was continued for 30 minutes at 54–57° C. The resulting emulsion was then cooled to room temperature.

The solids content of the product was 53.3%. Its pH was 7.7 and its Brookfield viscosity was 1440 cp. at 25° C. and 60 r.p.m. as determined with a No. 3 spindle. After two weeks at 60° C. the emulsion had a viscosity of 690 cp. at 25° C. After five freeze-thaw cycles it was still fluid. It had good mechanical stability.

Furthermore, a 30% PVC paint made from the product showed excellent wet adhesion to wood.

We claim:

1. A mechanically and freeze-thaw stable emulsion comprising an aqueous phase having dispersed therein a copolymer which is the reaction product of a carboxylic vinyl ester/ethylene copolymer and an alkylene imine compound of the formula:

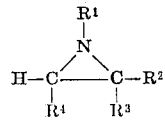

wherein $R^1$, $R^2$, and $R^3$ are selected individually from the group consisting of hydrogen, benzyl, and $C_1$ to $C_5$ alkyl radicals; and $R^4$ is hydrogen or a $C_1$ to $C_5$ alkyl radical and containing at least 0.2 weight percent, based on the copolymer weight, of a water-soluble protective colloid selected from the group consisting of methyl cellulose, hydroxyethyl cellulose, hydroxypropyl cellulose and polyvinyl alcohols; the carboxylic vinyl acetate/ethylene copolymer having been prepared in the presence of the protective colloid and containing 1–18 weight percent copolymerized ethylene, 80–95 weight percent copolymerized vinyl ester, and, prior to imination, 0.01–1.0 milliequivalent of acid per gram of polymer with about 5–55 percent of the acid groups iminated.

2. The emulsion of claim 1 containing at least 0.5 weight percent, based on the copolymer weight, of anionic surfactant and not more than about 3 weight percent protective colloid.

3. The emulsion of claim 2 wherein the carboxylic vinyl ester/ethylene copolymer contains 83–92 weight percent copolymerized vinyl ester, 7–16 weight percent copolymerized ethylene, and, prior to imination, 0.05–0.5 milliequivalent of acid per gram of polymer.

4. The emulsion of claim 3 wherein about 20–40 percent of the acid groups in the copolymer have been iminated with ethylenimine or propylenimine and wherein the emulsion has a pH of about 7–8.

5. The emulsion of claim 4 wherein the vinyl ester is vinyl acetate and the carboxylic vinyl acetate/ethylene copolymer contains copolymerized acrylic or methacrylic acid amounting to about 0.7–4 weight percent, based on the copolymer weight.

6. The emulsion of claim 5 wherein the protective colloid is water-soluble hydroxethylcellulose with a degree of substitution of about 2.5–3 and a 2% water solution Brookfield viscosity (#2 spindle at 60 r.p.m.) no higher than about 500 centiposies at 25° C.

7. The emulsion of claim 5 wherein the protective colloid is water-soluble 85–100% hydrolyzed polyvinyl alcohol having a 4% water solution Hoeppler falling ball viscosity of no higher than about 45 centipoises at 20° C.

8. The emlusion of claim 2 wherein the protective colloid is present to the extent of about 0.3–1 weight percent.

9. The emulsion of claim 8 wherein the protective colloid is water-soluble hydroxyethylcellulose with a degree of substitution of about 2.5– 3 and a 2% water solution Brookfield viscosity (#2 spindle at 60 r.p.m.) no higher than about 500 centipoises at 25° C.

10. The emulsion of claim 8 wherein the protective colloid is water-soluble 85–100% hydrolyzed polyvinyl alcohol having a 4% water solution Hoeppler falling ball viscosity of no higher than about 45 centipoises at 20° C.

11. In the process of preparing a mechanically and freeze-thaw stable aqueous copolymer emulsion comprising forming a carboxylic vinyl ester/ethylene copolymer by copolymerizing, in an aqueous medium, 1–18 weight percent ethylene, 80–95 weight percent vinyl ester, and sufficient carboxylic acid containing copolymerizable monomer to give the resulting copolymer 0.01–1.0 milliequivalent of acid per gram of polymer; the improvements comprising (A) accomplishing the above copolymerization in the presence of at least 0.2 weight percent, based on the copolymer weight, of water-soluble protective colloid selected from the group consisting of methyl cellulose, hydroxyethyl cellulose, hydroxypropyl cellulose and polyvinyl alcohols and (B) iminating the carboxylic copolymer by reacting 5–55 percent of the acid groups with an alkylene imine compound of the formula:

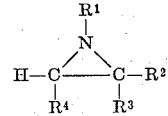

wherein $R^1$, $R^2$, and $R^3$ are selected individually from the group consisting of hydrogen, benzyl, and $C_1$ to $C_5$ alkyl radicals; and $R^4$ is hydrogen or a $C_1$ to $C_5$ alkyl radical.

12. The process of claim 11 wherein the aqueous medium in which the carboxylic vinyl ester/ethylene copolymer is formed contains at least 0.5 weight percent, based on the copolymer weight, of anionic surfactant and not more than 3 weight percent protective colloid.

13. The process of claim 12 wherein 20–40 percent of the acid groups in the copolymer are reacted with ethylenimine or propylenimine and wherein the emulsion, after imination, has a pH of about 7–8.

14. The process of claim 13 wherein the protective colloid is selected from water-soluble hydroxyethylcellulose and water-soluble polyvinyl alcohol.

15. The process of claim 14 wherein the carboxylic vinyl ester/ethylene copolymer is prepared by copolymerizing 83–92 weight percent vinyl acetate, 7–16 weight percent ethylene, and 0.7–4 weight percent acrylic or methacrylic acid.

16. The process of claim 15 wherein the polymerization is accomplished in the presence of 0.3–1 weight percent of the protective colloid.

17. In the process of preparing a mechanically and freeze-thaw stable aqueous copolymer emulsion comprising forming a carboxylic vinyl ester/ethylene copolymer by copolymerizing, in an aqueous medium, 1–18 weight percent ethylene, 80–95 weight percent vinyl ester, and sufficient carboxylic acid containing copolymerizable monomer to give the resulting copolymer 0.01–1.0 milliequivalent of acid per gram of polymer; the improvements comprising (A) accomplishing the above copolymerization in the presence of at least 0.2 weight percent, based on the copolymer weight, of a water-soluble protective colloid selected from the group consisting of methyl cellulose, hydroxethyl cellulose, hydroxypropyl cellulose and polyvinyl alcohols and (B) iminating the carboxylic copolymer by adding to the aqueous medium wherein copolymerization was accomplished an alkylene imine compound of the formula:

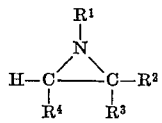

wherein $R^1$, $R^2$ and $R^3$ are selected individually from the group consisting of hydrogen, benzyl, and $C_1$ to $C_5$ alkyl radicals; and $R^4$ is hydrogen or a $C_1$ to $C_5$ alkyl radical, in an amount equal to about 10–200 percent of the theoretical stoichiometric amounts required to react with all of the carboxyl groups.

18. The process of claim 17 wherein the aqueous medium in which the carboxylic vinyl ester/ethylene copolymer is formed contains at least 0.5 weight percent, based on the copolymer weight, of anionic surfactant and not more than 3 weight percent protective colloid.

19. The process of claim 18 wherein the aziridine compound is ethylenimine or propylenimine which is added in an amount equal to about 60–150 percent of the theoretical stoichiometric amount required to react with all of the carboxyl groups.

20. The process of claim 19 wherein the protective colloid is selected from water-soluble hydroxyethylcellulose and water-soluble polyvinyl alcohol.

21. The process of claim 20 wherein the carboxylic vinyl ester/ethylene copolymer is prepared by copolymerizing 83–92 weight percent vinyl acetate, 7–16 weight percent ethylene, and 0.7–4 weight percent acrylic or methacrylic acid.

22. The process of claim 20 wherein the aziridine compound is added in an amount which is about equal to the theoretical stoichiometric amount required to react with all of the carboxyl groups.

23. The process of claim 22 wherein the polymerization is accomplished in the presence of 0.3–1 weight percent of the protective colloid.

References Cited

UNITED STATES PATENTS 3,261,797   7/1966   McDowell et al. __ 260—29.6HN

WILLIAM H. SHORT, Primary Examiner

L. M. PHYNES, Assistant Examiner

U.S. Cl. X.R.

260—29.6, 878, 897, 80.8, 87.3; 117—148